United States Patent
Wieczorek

Patent Number: 5,773,956
Date of Patent: Jun. 30, 1998

[54] METHOD FOR CHARGING A RECHARGEABLE BATTERY

[75] Inventor: Rudi Wieczorek, München, Germany

[73] Assignee: Mikron Gesellschaft fur Integrierte Mikroelektronik mbH, Eching, Germany

[21] Appl. No.: 553,220

[22] Filed: Nov. 7, 1995

[30] Foreign Application Priority Data

Nov. 7, 1994 [DE] Germany .......................... 44 39 785.2

[51] Int. Cl.$^6$ ................................................. H02M 10/44
[52] U.S. Cl. ................................................. 320/30; 320/35
[58] Field of Search ................................. 320/48, 35–36, 320/30–34, 39–40, 43–44

[56] References Cited

U.S. PATENT DOCUMENTS

| | | | |
|---|---|---|---|
| 4,308,493 | 12/1981 | Kothe et al. | 320/35 |
| 5,214,370 | 5/1993 | Harm et al. | 320/35 |
| 5,241,259 | 8/1993 | Patino et al. | 320/35 |
| 5,315,228 | 5/1994 | Hess et al. | 320/35 X |
| 5,493,199 | 2/1996 | Koenck et al. | 320/35 |
| 5,504,416 | 4/1996 | Holloway et al. | 320/35 X |

FOREIGN PATENT DOCUMENTS

| | | |
|---|---|---|
| 40 17 475 A1 | 12/1991 | Germany . |
| 94 08 094.1 | 9/1994 | Germany . |

OTHER PUBLICATIONS

"Vortrage und Begleittexte zum Entwicklerforum: Batterian und Ladekonzepte", Jun. 7, 1994, Munich, Germany.
"Impulsladung Von Akkumulatoren" Ernst Maier, Zeitschrift etz Bd. 103 (1982) Heft 1, pp. 13–17 (See Appln. p. 3).

*Primary Examiner*—Peter S. Wong
*Assistant Examiner*—K. Shin
*Attorney, Agent, or Firm*—Cushman, Darby & Cushman IP Group of Pillsbury Madison & Sutro LLP

[57] ABSTRACT

In a method for charging a rechargeable battery an ultra-fast charging of in particular NiMH-batteries is achieved by controlling the charging current and the charging voltage, respectively, such that the temperature of the battery is constant. Due to the constant temperature control it is avoided that unnecessary electrical energy is waisted for heating the battery. The end of charging is preferably determined by detecting a predetermined change of the charging efficiency.

18 Claims, 9 Drawing Sheets

METHOD FOR CHARGING A RECHARGEABLE BATTERY

BACKGROUND OF THE INVENTION

The present invention relates to a method for charging a rechargeable battery and, in particular, to determining the optimum end (criterion) in a method of charging a rechargeable battery. NiCd and NiMH batteries are presently often used in portable electronic devices such as lap-tops, videocameras, cordless tools, cellular phones, cordless devices for any kind of use . . . Further, re-chargeable batteries appear to offer a solution for the global problem of distribution of energy.

Recently developed NiMH-batteries are considered to be a most promising technology. NiMH-batteries have—compared to NiCd-batteries—higher capacities and less negative effects for the environment. However, NiMH-batteries still possess lesser capabilities for high current values and a bad behaviour in the low temperature regime and are, in particular, not suitable for the recently developed fast and ultra-fast charging methods. This is due to the fact that the usual criteria for determining the end of the charging process for NiCd-batteries (e.g. the "ΔU" -method in the case of charging with a constant current) cannot easily be adapted to NiMH-batteries. Furthermore, in the case of NiMH-cells, the absolute values of the voltage and the form of the charging characteristic or curve change as a function of temperature. At present, NiMH-batteries can only be charged using a fast charging method (the charging time of which is about 1 hour) while the development of ultra-fast methods for charging NiCd-batteries has shortened the charging time for these batteries down to about ten minutes.

The prior art charging methods for batteries use effects of temperature only for detecting or determining the end of the charging process by using a detection that a predetermined absolute or relative temperature has been reached or by detection of a predetermined value of the temperature gradient the use of a fixed or predetermined temperature value as a criterion for determining the end of the charging process caused, in particular with the first devices for fast charging of NiCd-cells, in particular, when cold batteries are charged, al over-charging having a negative effect on the battery's lifetime. The method using the temperature gradient strongly depends on the type of battery used. To sum up the prior art, data that have been obtained from a temperature measurement have so far only been used for determining the end of the charging process and in most cases as an additional safety means for protection against overcharging. At the end of the charging, most of the introduced electrical energy contributes to heating of the battery.

The most common method for determining the end of the charging comprises charging the battery with a constant current wherein the so-called "–ΔU"-criterion is used for switching off the power supply. The publication "Voltage und Begleittexte zum Entwicklerforum: Batterien und Ladekonzepte", A. Eiblmayr, Jun. 7, 1994, Design & Elektronik is mentioned as representative of the state of the art discussed above.

With respect to the prior art, attention is drawn to U.S. Pat. 5,315,228 from which a control-device for charging a battery and a monitoring system for the voltage, the temperature, the charging andydischarging current of a rechargeable battery is known. However, monitoring the temperature is only used for preventing temperatures that could damage the battery.

From DE G 94 08 094.1 a method for charging storage devices for electrical energy is known. In this apparatus the charging current is controlled (not the temperature of the battery). In order to avoid damage of the stoting device when charging with a current that is too high if the ambient temperature is too low the controlled value of the current depends on a measurement of ambient temperature.

From DE 40 17 475 A1 an arrangement of a rechargeable battery is known in which the battery is thermally insulated. Peltier elements are provided to keep the temperature in a predetermined temperature range.

From the article, "Impulsladung von Akkumulatoren", Ernst Meier, etz, vol. 103, (1982), iss. 1, the use of current pulses in the charging of rechargeable batteries is known.

OBJECTS OF THE INVENTION

It is an object of the present invention to advance the state of the art relating to charging methods for rechargeable batteries.

It is another object of the present invention to provide a method for charging rechargeable batteries that can even be used for an ultra-fast charging of NiMH-batteries, whereby it is avoided to waste electrical energy for heating the battery.

It is an object of the present invention that by controlling the temperature to be, constant: during the charging method the entire process of charging can be carried out in a more controlled way that for example improves the safety of the charging method. In particular, an overheating of the battery is avoided using the method according to the inventions It is another object of the present invention that by holding the temperature of the battery constant during charging the number of free parameters and degrees of freedom, respectively, of the battery (charge of the battery, temperature . . . ) is reduced, i.e. the temperature is no longer a free parameter. Thereby, characteristics. such as characteristics provided by the manufacturer of the battery can be used for determining a constant (optimum) charging temperature dependent on the type of battery used and on parameters depending on the individual batteries. Further, less data have to be provided by the manufacturer. The usual charging using a constant current during the charging process does not limit or reduce the parameter space of the battery.

It is another object of the present invention to provide a method for charging a battery that not only assists in increasing the lifetime of the battery but also helps to reduce aging effects of batteries such as a decrease of their capacity.

It is another object of the present invention to provide an optimum temperature for the charging process depending on parameters such as ambient temperature, battery temperature, actual capacity of the battery, type of battery and state of charge of the battery. This optimum temperature is determined and is held constant during the entire charging process.

It is another object of the present invention to provide a method for charging a battery which is applicable to a plurality of types of batteries, in particular, also to Pb-batteries. This is due to the fact that if the temperature is held constant the behaviour of the battery voltage is similar with different types of batteries.

SUMMARY OF THE INVENTION

The present invention provides a method for charging a rechargeable battery wherein the current or the corresponding voltage and temperature is measured wherein the charging current or the corresponding temperature is controlled (closed-loop-control) such that the temperature of the battery is constant. The end of the charging is preferably determined by a detection of a predetermined change of the charging efficiency, in particular, by detecting a predetermined ratio for the portion of the inputted electrical energy stored in the battery as chemical energy at the beginning and at the end of the charging.

According to a preferred embodiment of the invention, the charging current and the voltage, respectively, is controlled (closed-loop-control) using a two-point, proportional (P-), proportional integral (PI-) or a proportional integral derivative (PID-) control. A two-point control is defined by the feature that the control parameter, e.g. the charging current can only have two predetermined values, for instance, "switched on" and "switched off" dependent on a predetermined temperature range. Of course, other types of controls known in the art can also be used, e.g. a fuzzy-logic control.

According to another aspect of the present invention, the temperature which, using the charging current or charging voltage control, has to be kept constant as well as the initial value for the charging current or the voltage is predetermined dependent on one or more of the following parameters: ambient temperature, battery temperature, actual capacity of the battery, type of the battery and state of charge of the battery. The temperature of the battery is defined as the temperature of the battery before the start of the charging process which does not necessarily coincide with the ambient temperature. The actual capacity also is in general different from the nominal capacity of the battery inasmuch as the capacity of the battery can change due to aging effects such as the so-called "memory effect" or one or more overcharging or discharging events. Finally, also the type of battery and the state of charge of the battery is important for determining the control temperature or the initial value for the charging current and the charging voltage, respectively. For instance, if the battery is fully charged, the charging current must not be too high. Also, dependent of the type of battery used, the controlled temperature must not be too high for reasons of safety. Preferably, the dependencies of the controlled temperature and the initial value for the charging current or voltage on the above-mentioned parameters are known in the form of (look-up) tables which can, for instance, be provided by the manufacturer. Preferably, interpolation methods are used when exploiting data from the tables. It is an advantage of the present invention that by providing a constant control temperature the use of such a table is much easier and the method according to the invention is much more specific for a certain type of battery or for an individual battery.

According to an embodiment of the present invention the charging of the battery is pulsed. A measurement of the voltage of the battery which is a measure for the state of charge of the battery is then preferably carried out in a pause of the charging pulse. Relaxation processes such as chemical relaxation processes should be finished during the measurement. Therefore, the measurement of the battery voltage is preferably carried out near or at the end of the pause of the charging pulse. The control of the battery is in this embodiment realized using a pulse width modulation (PWM) method.

Preferably, a semiconductor switch such as a field effect transistor (FET) is integrated in a battery and a battery pack, respectively. By switching the semiconductor element the pulse width is modulated and thereby a proper control value averaged with respect to time over one pulse for the charging current or voltage is provided.

The semiconductor switch can also serve as a fast switch for interrupting the charging current in the case of an overcharging condition. If the semiconductor switch cooperates with a temperature sensor the charging process can also be interrupted in the case of a too high temperature or of a heating of the battery which is too fast. The semiconductor switch can also prevent a complete discharge of the battery, which increases the battery's lifetime as well as has other positive influences on other parameters of the battery and which can be important for the user because there is always a rest charge in the battery. In the known battery packs only a PTC-resistor ("a positive temperature coefficient" -resistor) is integrated, the resistance of which strongly increases in case of a temperature increase. There is no direct access to this PTC-resistor such as by a control switch command and this resistor can neither prevent a complete nor a partial discharge of the battery. The PTC-resistor detects overcharging only by detecting the secondary effect of the temperature increase, while the semiconductor switch according to the invention can directly open the circuit, i.e. disconnect the battery, for instance by using as a switch criterion the relative state of charge determined by an integration of the current.

Preferably, the end of charging is determined at a predetermined change of the charging efficiency. The following equation shows in a simplified manner into what terms the electrical power inputted into the battery can be split:

$$P_{electrical} = I \cdot U = d/dt(c_1 \Delta T_b + C_2 \cdot (T_b - T_a) + C_3 \cdot (T_b^4)) + P_{chemical}$$

$T_b$=battery temperature, $T_a$=ambient temperature
$C_1$~ heat capacity of the battery, $C_2$~ heat conduction coefficient, $C_3$ ~Stefan-Boltzmannhconstant and $P_{chemical}$= portion of the electrical energy that is chemically stored in the battery.

In the above equation the first, second and third terms designate power terms related to temperature increase, heat conduction and heat radiation, respectively. If the control temperature is higher than the ambient temperature then, in the beginning of a charging process of a discharged battery, the largest portion of the inputted electrical energy goes into chemical storage of energy, i.e. an increase of the state of charge the battery and a smaller portion of the inputted electrical energy is responsible for a temperature increase of the battery. A very small portion of the inputted electrical energy (depending of course on ambient-conditions) is lost by heat radiation and conduction, respectively. When the end of the charging of the battery has been reached, only a small portion of the charging electrical energy increases the state of charge of the battery, no portion of the electrical energy contributes to a temperature increase (because the control temperature is already reached and constant) and the main portion of the electrical energy is radiated and conducted away, respectively, to keep the temperature constant. This behaviour can, for instance, be seen, in the behaviour of the current during the charging process as will be explained in more detail below. For instance, a predetermined ratio of charging current values can be used for a detection of a change of the charging efficiency as an end criterion for the charging process. Also, the increase and decrease, respectively, of heat energy that is radiated or conducted away, could be detected. From the above equation it can be seen that if the ambient temperature $T_a$ is constant the portion of the inputted electrical energy that does not contribute to a chemical storage of energy is in the process according to the invention constant (P=dE/dt=0; I is controlled such that $T_b$=constant). The constant loss portion can be minimized by an appropriate choice of the control temperature of the initial or starting values for current and voltage.

The initial (after the beginning of the phase of constant temperature) electrical power $P_{el,i}$ can be split as follows:

$$P_{el,i} = x \cdot P_{el,i} + (1-x) \cdot P_{el,i}$$

wherein $x \cdot P_{el,i}$ designates the portion of $P_{el,i}$ that is lost by heat radiation and heat conduction and $(1-x) P_{el,i}$ designates the portion of $P_{el,i}$ that is chemically stored in the battery. Assuming (the reason for this assumption lies in the fact that T=constant) that at the end of the charging process the heat loss portion has the same magnitude as at the beginning while the portion that increases the charge of the battery is reduced by a factor of f the following equation can be rewritten:

$$P_{el,f} = X \cdot P_{el,i} + f \cdot (1-X) \cdot P_{el,i=}$$

electrical power which is inputted at the end of the charging process. Thus follows:

$$P_{el,f}/P_{el,i} = f - (f+1) \cdot x$$

As f and x are constants depending on the specific battery used, the charging method according to the invention can be stopped when the ratio of the inputted electrical power $P_{el,f}$ at the end of the charging to the inputted electrical power $P_{el,i}$ inputted at the beginning of the charging (n.b. for keeping the temperature constant) reaches a certain or predetermined threshold value C, i.e. the charging efficiency decreases to a certain percentage value. In the case that the voltage of the charging device is sufficiently constant, the above equation can be rewritten as a stop or end criterion for the charging as follows:

$I_2/I_1 \leq C = C$(type of battery, control temperature, age of the battery, charging current, actual capacity of the battery, "past life" of the battery . . . )

The critical threshold value C can be provided by the manufacturer and can for instance be stored (and updated) in a ROM (RAM) (compare FIG. 9) as a function of the above-mentioned parameters. Alternatively, also the (charging) voltage can be measured so that an equation is set up for the inputted power during the charging process and as already explained above the ratio of the inputted electrical energy (increasing the charge of the battery) at the beginning to the inputted electrical energy (increasing the charge of the battery) at the end of the charging method can be used as an end criterion for the charging process. Advantageously, different end criteria are used and the criterion that is first fulfilled is actually used for stopping the charging process, wherein the remaining criteria serve for an additional safety or fail-safe-criterion.

BRIEF DESCRIPTION OF THE DRAWINGS

For a more complete understanding of the invention and the advantages thereof, reference is made to the following description taken in conjunction with the accompanying drawings in which:

In FIG. 1 to 4 the time t in minutes is shown on the x-axis and the battery voltage U in volts, the battery temperature T in degrees Celsius, the first derivative of the temperature with respect to time dT/dt in Kelvin per minute, the relative state of charge Qrel of the battery in % and the charging current I in CA are shown on the y-axis. Therein 1 CA designates a current that is numerically equal to the capacity of the battery in ampere hours (Ah). The relative state of charge Qrel is determined by integrating the current with respect to time. U designates in FIG. 1 to 4 the voltage between the connectors of the battery, i.e. $U = R_i \cdot U_{EMF}$ (EMF=electromotive force). Due to the inner resistance ($R_i$=inner resistance) the behaviour of I(t) largely corresponds to the behaviour of U(t), e.g. with respect to monotonic behaviour. All curves depicted in FIG. 1 to 4 have been recorded with NiMH-batteries. The charge of the six (FIG. 1) and nine (FIG. 2–4) NiMH-cells is respectively 2400 mAh. The battery packs were sufficiently insulated against disturbing influences (with respect to temperature) of the surroundings for carrying out the tests of FIG. 1 to 4. It is assumed for the method according to the invention that the (ambient) conditions of heat conduction and radiation are sufficiently constant, i.e. such that the temperature can be controlled.

Referring now to FIGS. 1 and 10, the method according to the invention is illustrated. At the beginning of the charging process (t=4 –24 min, step 110) a constant current I=2 CA is used to charge the battery whereby the temperature increases up to T=(step 120). At this predetermined temperature the constant T control sets in(step 130). The deviations of the control temperature T=48° C. in the controlled region (t=25–50 min) are not substantial and were caused by the control. It can be seen from FIG. 1 that the relative state of charge (Qrel) continuously increases, wherein the increase is approximately linear and wherein in the region of constant current charging a steeper increase than in the region (t=25–50 min) in which the temperature control operates can be observed. Also the first derivative of temperature with respect to time dT/dt is shown. The derivative of the temperature is only negative in a region in which a small decrease in temperature is not prevented by the control. From the initial strong steepness of the derivative of the temperature it can be deduced that the battery is nearly fully charged if the derivative of the temperature is larger than a predetermined value which corresponds substantially to the heat capacity of the battery. The voltage U increases sharply at the beginning of the constant current charging and the increase becomes weaker after several minutes so that the voltage is approximately constant and decreases after the controlled condition is reached wherein the monotonic behaviour corresponds substantially to the monotonic behaviour of the current. Note that the battery voltage, i.e. the voltage at the battery terminals, is shown as explained above. The control oscillation which can be recognized in the current and voltage curves at t=25 min is due to the use of an insufficient control. Also, two values for the charging current $I_1$ and $I_2$ are shown in FIG. 1 which can be used as an end criterion (step 140) for ending the charging (step 150) in a manner as already explained above.

In FIGS. 2 and 11 embodiment of the present invention is shown in which the charging of the battery is pulsed. Initially a constant current of I=1 CA is used too charge the battery wherein the temperature and the relative state of charge of the battery increase approximately linear. If a temperature of 39° C. is reached (step 210) the temperature control according to the invention starts at a control temperature of T=40° C (step 220). When the battery is charged to about 95% (Qrel=95%) (step 230) a constant current of about 0.1 CA is finally used to charge the battery(step 240). Thereby the temperature increases once more over 40° C. to subsequently decrease again. During the charging with a constant current the relative state of charge reaches 100%. From FIG. 2 it can be seen that the method according to the invention is embedded in two phasesof constant current charging. As the last phase of the charging is a constant current charging a known end criterion (step 250) for ending the charging (step 260) such as the −ΔU−method can be used. While the first phase of the charging which is also a constant current charging phase ends when the temperature has reached the control temperature the start of the third phase is determined as follows. According to the invention the temperature control charging method is stopped when the charging efficiency decreases under a predetermined critical value. For example, the ratio of the charging current at the start and at the end of the temperature controlled charging which is in general a function of a plurality of parameters such as the ambient temperature, the control temperature, the actual capacity of the battery, the age of the battery, the type of battery . . . can be used. Also, the battery voltage U or a function f (U,U',U" . . . ) can be used inasmuch as such an end criterion is more accurate due to the fact that the temperature is constant compared to conventional methods. Therein U, U', U" . . . designate the derivatives of the battery voltage with respect to time with disconnected load. Effects of the inner resistance of the battery, therefore, do not have to be considered and do not negatively influence the battery voltage as a measure for the state of charge of the battery. Alternatively, the phase of the temperature control can also be stopped at a value of Qrel=95% and the last 5% of the charge can be inputted with a lower constant current.

In FIG. 3 a portion of FIG. 2 is shown, i.e. the phase using the temperature control. In FIG. 3 the pulses of the current I and the pulses of the voltage U resulting therefrom can clearly be seen as well the behaviour of the derivative of the temperature.

Referring now to FIG. 4, a further example of a pulsed charging method according to the invention is shown. In this case, the control temperature is 40° C. and the control sets in at 39° C. It can be clearly seen that—analogously to the decrease of the current with increasing charge of the battery in FIG. I (compare $I_l$, $I_2$)—the pauses between the current pulses increase whereby the average current I=$i_{average}$ increases. For the above-mentioned end criterion for, the charging now $i_{average,1}$ and $i_{average2}$ have to be used in the case of a pulse charging.

Referring now to FIG. 5, two subsequent current pulses are shown, wherein the amplitude of the current pulse is designated with kp and the pulse width is t1 and the period of the pulses is t2. The current is controlled by its average value, i.e. t2 is controlled such that I=$i_{average}$=kp(t1/(t1+t2)). A measurement of the battery voltage is preferably carried out in the time period t2, i.e. in a pause of the pulse. In this manner the battery voltage can be measured without any disturbing effects due to the inner resistance of the battery. To minimize disturbing influences resulting from chemical relaxation processes in the battery during the measurement of the voltage, the measurement of the voltage is preferably carried out at the end of the time period designated by t2.

In FIG. 6 the so-called electromotoric force U(t) as well the first two derivatives with respect to time U'(t)=dU/dt(t), U"(t)=$d^2U/dt^2$(t). The electromotoric force of the battery is the voltage at the terminals of the battery if no load is connected. The battery voltage U and its derivatives U', U"shown in FIG. 4 do not take into consideration effects resulting from the inner resistance of the battery. The behaviour of the battery U shown in FIG. 6 is a typical behaviour resulting from, for instance, a constant current charging. With a conventional constant current charging, for example the −ΔU-criterion for determining the end of the charging is used. According to this known criterion the charging is stopped when the voltage decreases by ΔU after having reached a maximum. The predetermined −Δu (NiCd:ΔU ≦1%, NiMH:ΔU ≦0.25%) prevents a switching off of the charging current which is too early. Although in the method according to the invention the battery is not charged with a constant current, a similar (not illustrated) behaviour of the voltage U results. Due to constancy of the temperature the voltage is a substantially better indicator for the state of charge of the battery than it is with the conventional charging methods. Therefore, also a predetermined (battery dependent) absolute value for the voltage U can be used as an end criterion for the charging. According to another known method, the charging is stopped at the turning point of the voltage curve (in FIG. 6 shown by an arrow), i.e. at a zero point of the second derivative U". This criterion can also be used with the method according to the invention and finally also a combination of various criteria for U, U', U", . . . can be used as an end criterion inasmuch as the dependencies U(t), U'(t), U"(t) have a substantially more stable and more reproducable behaviour when used in the method according to the invention.

In FIG. 7 the integration of a semiconductor switch in a battery pack is shown. The battery pack comprises several cells 2, 3 and 4. As is shown by the phantom lines between cell 3 and cell 4 the battery pack can also comprise more and less cells, respectively. The semiconductor switch according to the invention is, in the embodiment of FIG. 7, a field effect transistor designated with reference numeral 10. The field effect transistor opens and closes the circuit, respectively, depending on the signal of its gate electrode, i.e. after the supply of a suitable control voltage $U_{GS}$(=voltage between gate and source of the transistor) by a control and measurement circuit 12. This can be necessary both during the charging and during discharge of the battery, e.g. to avoid an overcharging or overheating of the battery and a complete discharge of the battery, respectively. The circuit 12 also monitors the temperature of the battery pack using a temperature sensor 15 that is attached to the cell 4 in good thermal contact. By means of a shunt resistor 16 the charging and the discharging currents can be measured. Further, the circuit 12 can carry out an integration of the current whereby the respective relative state of charge of the battery can be obtained by a bilancation of the currents. If the temperature sensed by the temperature sensor 15 is too high or if a too high current flows through resistor 16 and if the state of charge of the battery is too high or too low, respectively, the circuit is opened by controlling the gate electrode of the field effect transistor 10. Preferably, the circuit 10 is implemented as an integrated circuit. The semiconductor switch 10 can also be used in the charging method explained above to generate the current pulses shown in FIG. 5.

Referring now to FIG. 8, another embodiment of the integration of a semiconductor switch according to the invention in a battery pack comprising cells 2 and 3 is shown. Commercially available field effect transistors have a diode integrated parallel to the source drain line. This necessitates with the method according to the invention the use of two field effect transistors 10 and 11 which are connected in series with antiparallel diodes, whereby current can flow both when charging the battery and when discharging the battery. To use the advantages of an integrated semiconductor switch at the battery pack both during charging and discharging of the battery two field effect transistors 10 and 11 (n-channel FET) are provided in series between the minus pole of cell 3 and the negative battery voltage source. The control of field effect transistors 10 and 11 is provided by a further (p-channel) field effect transistor 20. This transistor 20 controls the gates of field effect transistors 10 and 11 and close and open the circuit, respectively, both when charging and when discharging as the integrated diodes of field effect transistors 10 and 11 are oppositely oriented. A logic gate 25 is provided to control field effect transistor 20. Two resistors 27 and 28 having a high resistance are also provided. The resistor 27 is located between the plus terminal of the battery and the output of the logic gate 25. Resistor 28 is located between the minus terminal of the battery and the drain electrode of transistor 20.

Figure 1:
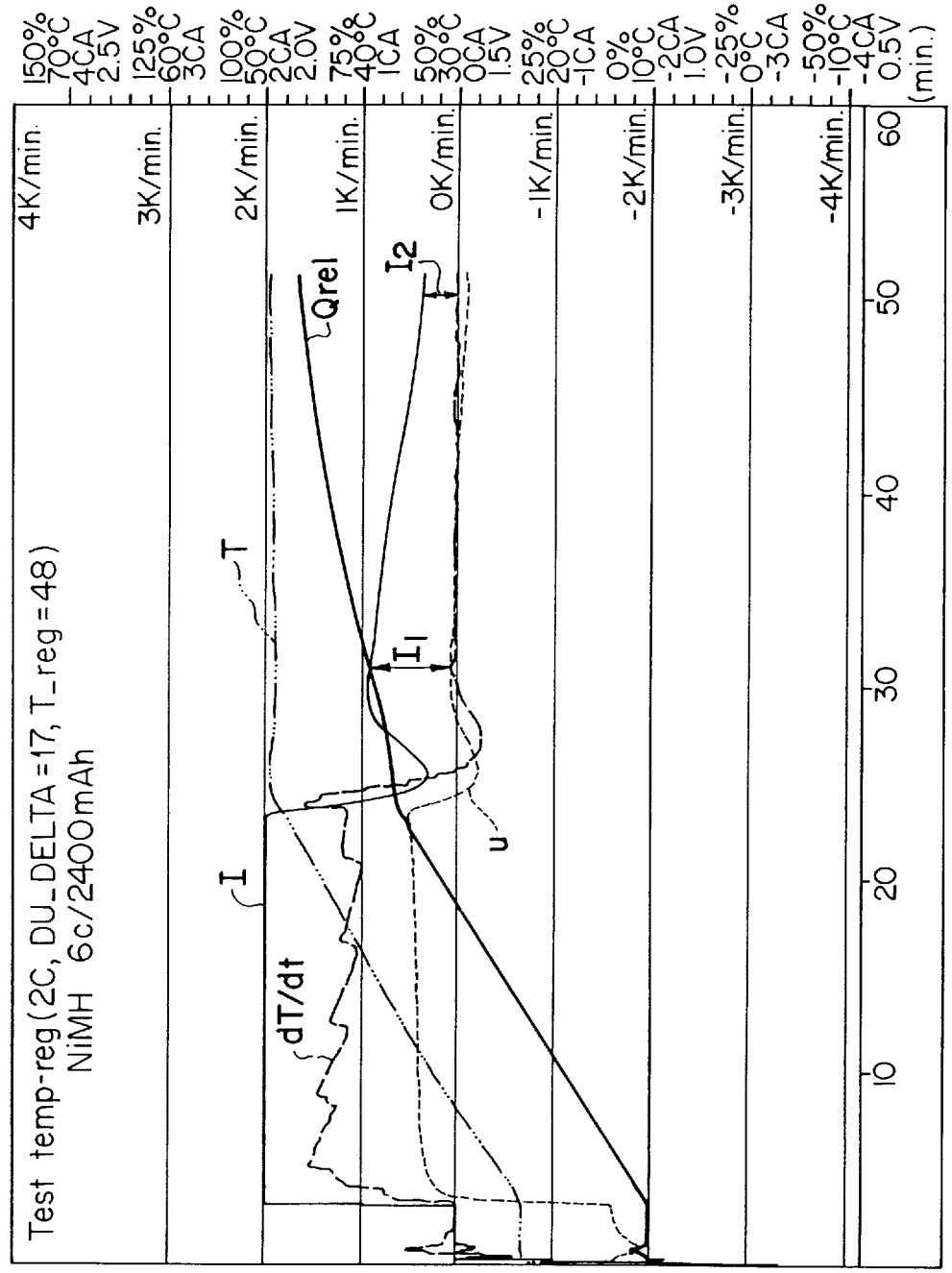
FIG. 1 shows a diagram illustrating characteristics or curves of the current, the temperature, the first derivative of the temperature with respect to time, the voltage and the relative charge of the battery in the method according to the invention.
Figure 2:
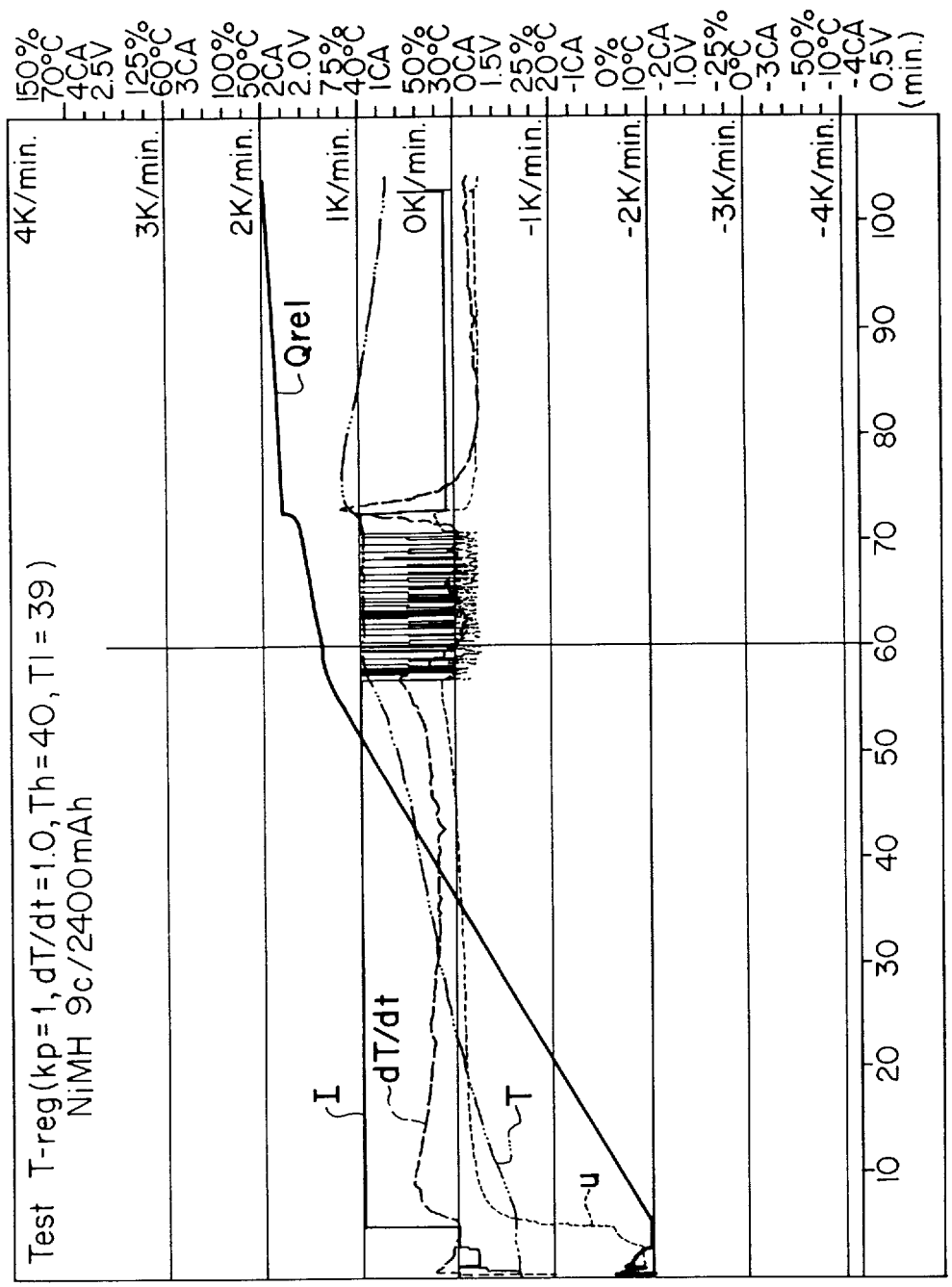
FIG. 2 shows a diagram similar to FIG. 1, wherein the control of the current is pulsed.
Figure 3:
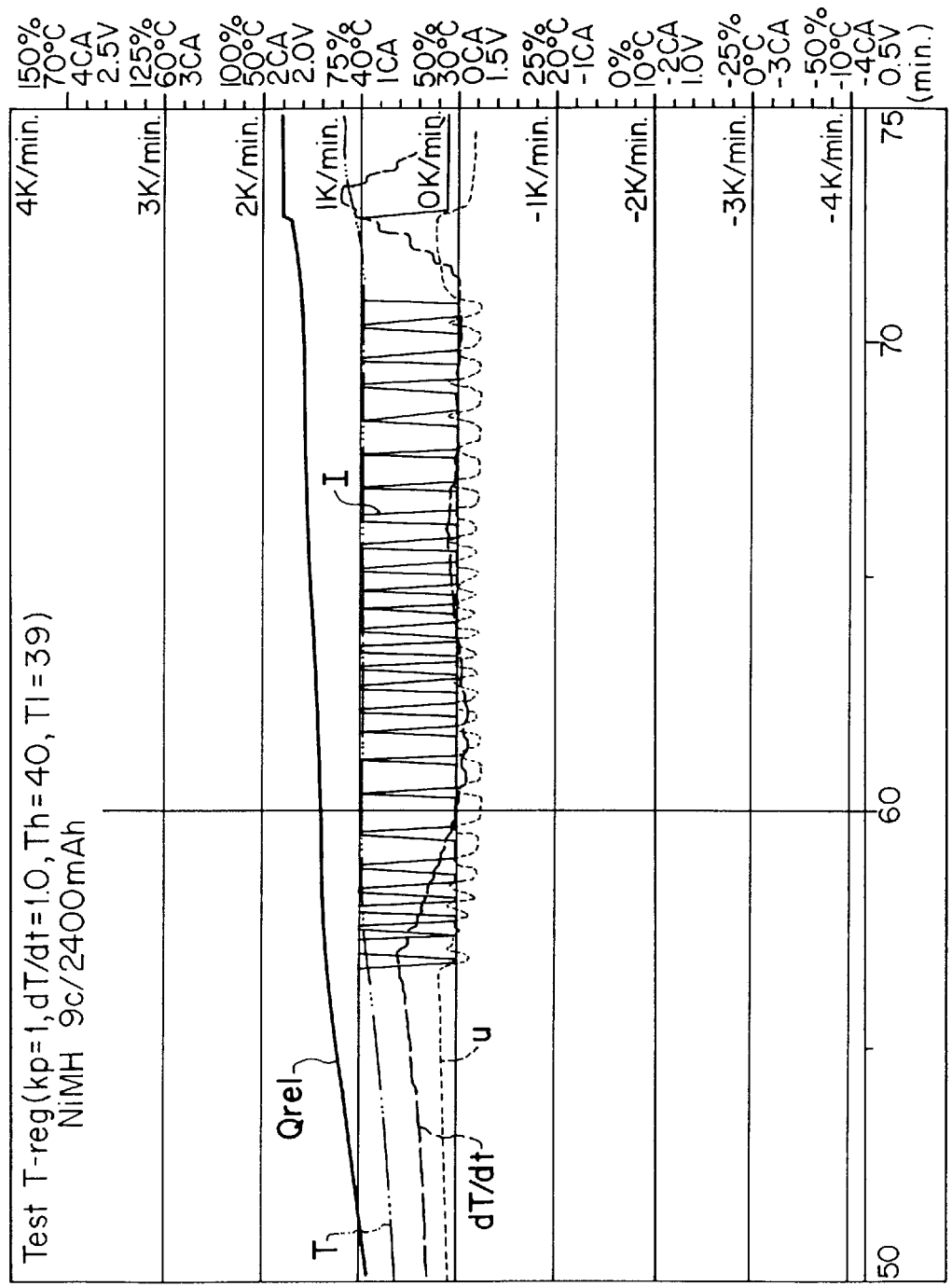
FIG. 3 shows an enlarged view of the diagram of FIG. 2.
Figure 4:
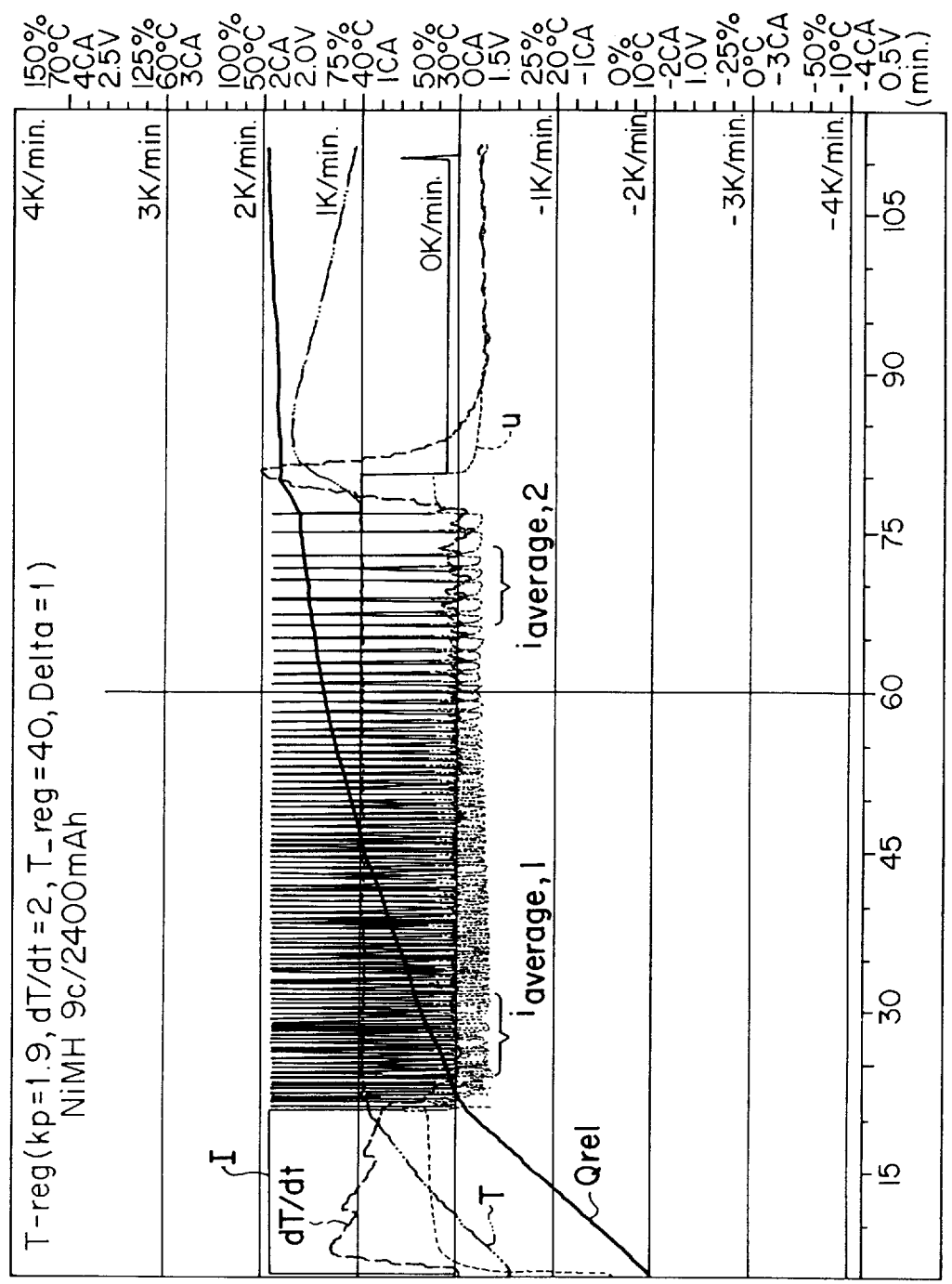
FIG. 4 shows a diagram similar to FIG. 2, also using a pulsed current control.
Figure 5:
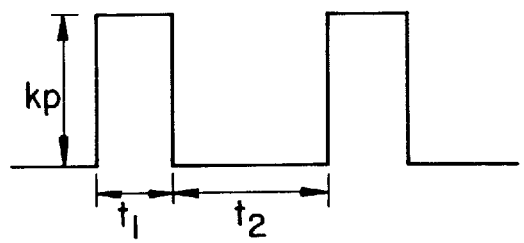
FIG. 5 shows an explanatory diagram for explaining the pulses used in the current control.
Figure 6:
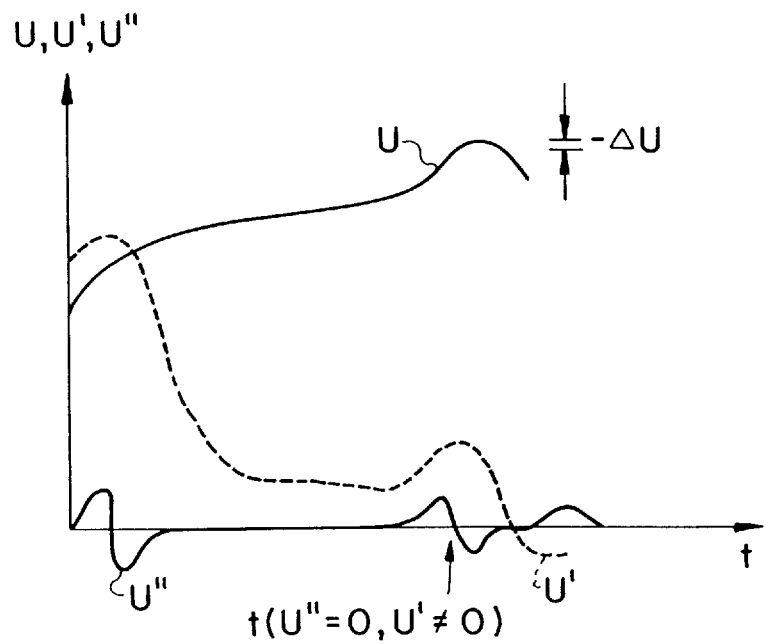
FIG. 6 shows a schematic diagram, illustrating the behaviour of U, U'and U''as a function of time.
Figure 7:
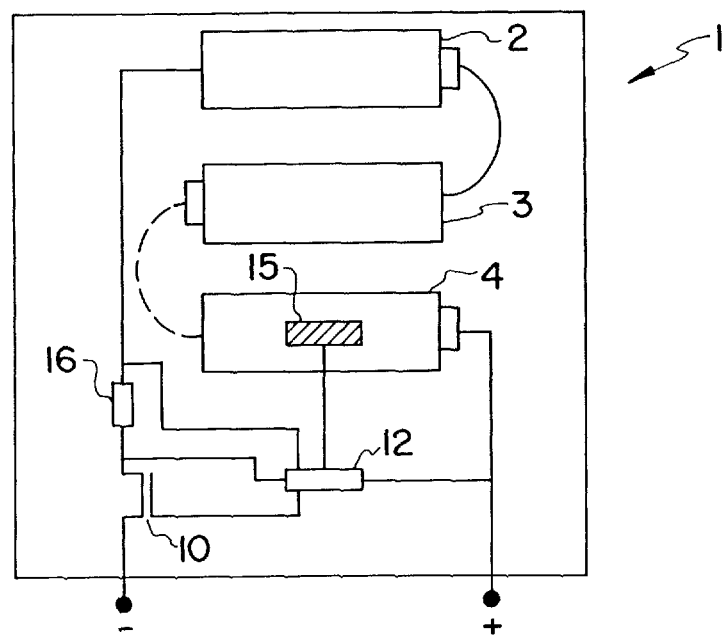
FIG. 7 shows a battery pack according to the invention having integrated a semiconductor switch.
Figure 8:
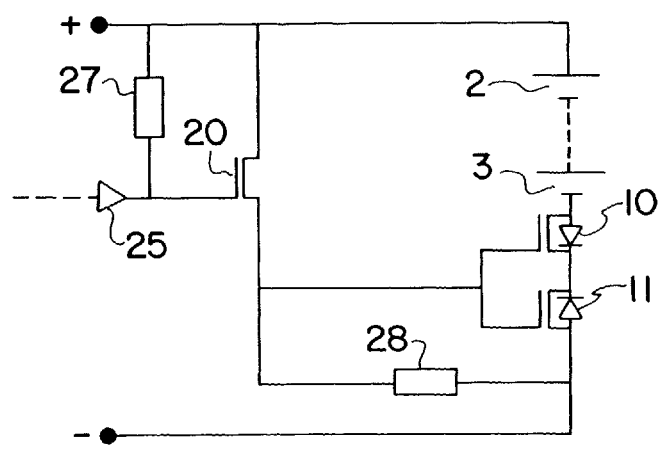
FIG. 8 shows a schematic block diagram of the integration of a semiconductor switch in a battery pack according to the invention.
Figure 9:
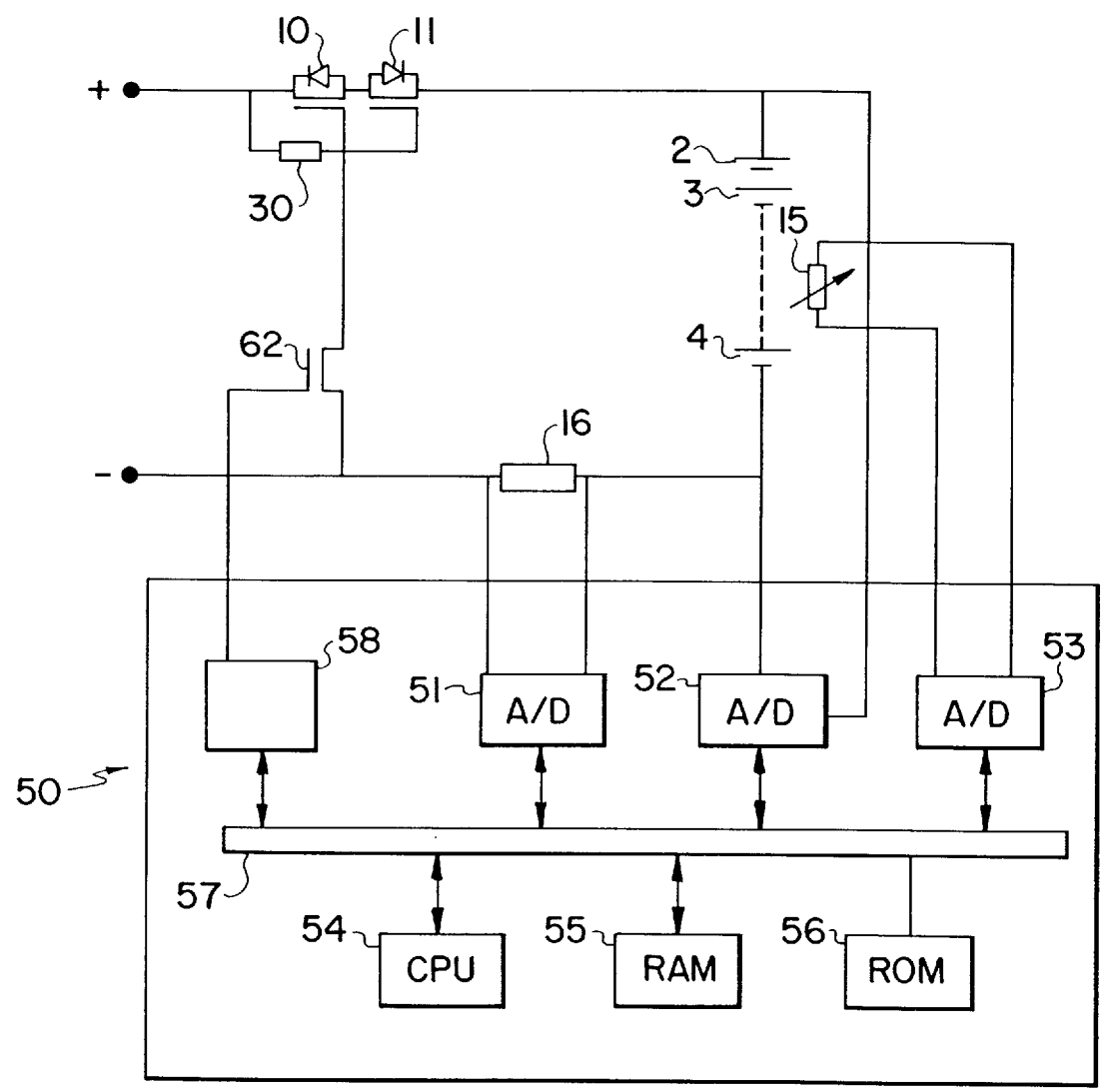
FIG. 9 shows a schematic block diagram wherein, in addition to the semiconductor switch, a control circuit and a measurement circuit is integrated in the battery pack.
Figure 10:
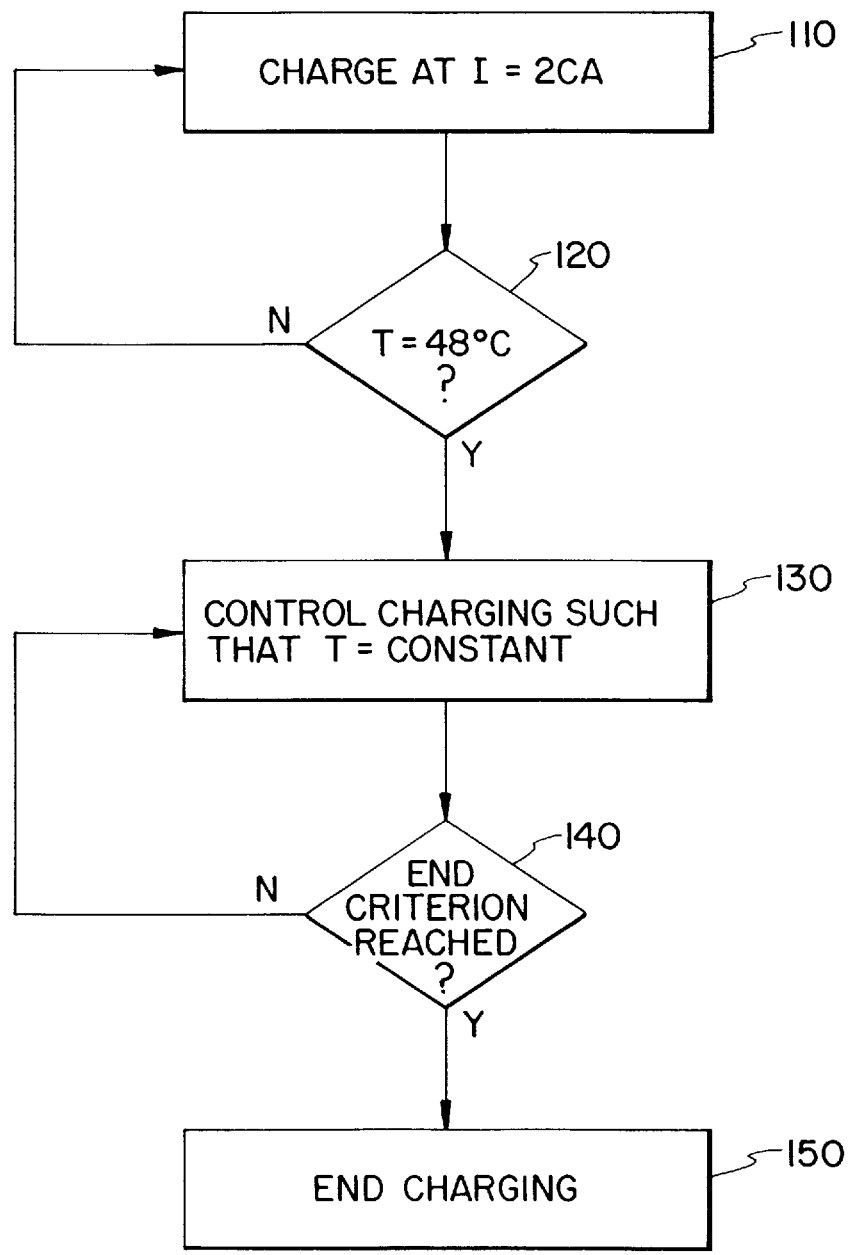
FIG. 10 illustrates the process steps of one embodiment of the method according to the invention.
Figure 11:
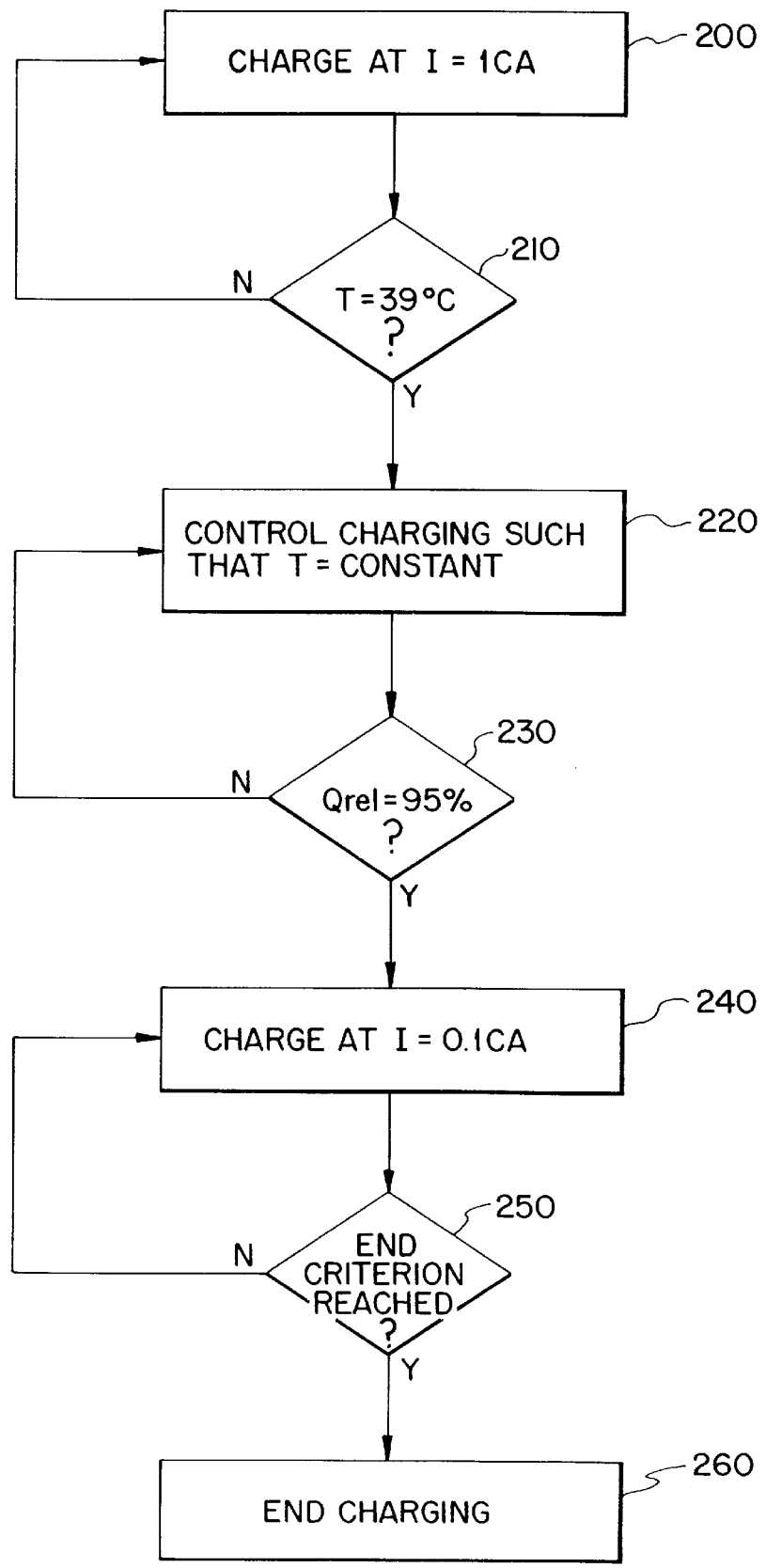
FIG. 11 illustrates the process steps of another embodiment of the method according to the invention.

In the embodiment shown in FIG. 9 the control and measurement circuit 50 comprises three A/D-converters 51, 52 and 53. The A/D-converter 51 digitizes data obtained from a current measurement across the shunt resistor 16. The A/D-converter digitizes the analogous value for the voltage of a battery pack comprising cells 2,3 and 4. A/D-converter 53 digitizes values for the temperature sensed by a temperature sensor 15. Further, the control circuit 50 comprises a CPU 54, a RAM 55 (for the storage of data) and a ROM 56 (for the storage of programs). The CPU 54 is a central processing unit which controls all processes such as transportation of data. In ROM 55 data are stored such as a current value of the temperature while in ROM 55 programs and constants, respectively, such as the above-mentioned data of the manufacturer are stored. Via the output register 58 a field effect transistor 62 is controlled which controls two field effect transistors 10 and 11, in a manner analogously to that shown in FIG. 8. The field effect transistor 10 and 11 connected in series also comprise two anti-parallel diodes to be able to switch both during charging and during discharging. A resistor 30 is provided between the source electrode and the gate electrode of transistor 10.

Without further analysis, the foregoing will so fully disclose the gist of the present invention that others can readily adapt it for various applications with omitting features that, from the stand point of prior art, fairly constitute essential characteristics of the generic or specific aspects of this invention and, therefore, such adaptations should and are intended to be comprehended within the meaning and range of equivalence of the following claims.

We claim:

1. A method for charging a rechargeable battery comprising the steps of:

measuring the charging current or the corresponding voltage and the temperature of the battery;

charging the battery with a constant current until the measured battery temperature is a predetermined temperature;

controlling the charging current or the corresponding voltage after the predetermined temperature is reached such that the temperature of the battery is held constant;

determining a charging efficiency by measuring a portion of electrical energy inputted to the battery that is conveyed into heat per unit of time; and ending the constant temperature charging when the determined charging efficiency falls below a predetermined level.

2. The method for charging a rechargeable battery according to claim 1, wherein the controlling step is performed using one of: two-point control, P-control, PI-control and PID-control.

3. The method for charging a rechargeable battery according to claim 1 or 2, wherein the temperature at which the battery is held constant during the controlling step is predetermined dependant on one or more of the following parameters: ambient temperature, battery temperature, actual capacity of the battery, type of battery and state of charge of the battery.

4. The method for charging a rechargeable battery according to claim 1 or 2, wherein the initial value at which the charging current or the corresponding voltage is controlled during the controlling step is predetermined dependent on one or more of the following parameters: ambient temperature, battery temperature, actual capacity of the battery, type of battery and state of charge of the battery.

5. The method for charging a rechargeable battery according to claim 1, wherein the controlling step includes causing the charging current to be pulsed.

6. The method for charging a rechargeable battery according to claim 5, wherein a measurement of the voltage of the battery is carried out in a pause of a charging pulse.

7. The method for charging a rechargeable battery according to claim 1, wherein the controlling step includes controlling a semiconductor switch for interrupting the charging current and discharging current, respectively.

8. The method for charging a rechargeable battery according to claim 1, further comprising a step of ending the charging process by detecting a predetermined change in the charging efficiency, in particular by detecting a predetermined ratio of the portions of the inputted electrical energy chemically stored in the battery at the beginning of and at the current stage of the charging process.

9. The method for charging a rechargeable battery according to claim 1, further comprising a step of ending the charging process by detecting a predetermined ratio of losses of heat conduction and heat radiation to the inputted electrical energy or to the portion of the inputted electrical energy that is chemically stored in the battery.

10. The method for charging a rechargeable battery according to claim 1, further comprising a step of ending the charging process by detecting at least one end criterion of a predetermined value of a function f (U, U', U") and a predetermined value for the ratio of losses of heat conduction and heat radiation to the inputted electrical energy and a predetermined change of the charging efficiency, wherein in the case of detecting more than one end criterion the end criterion which is first fulfilled is used.

11. The method for charging a rechargeable battery according to claim 1, further comprising a step of charging the battery with a second constant current after the step of ending the constant temperature charging.

12. The method for charging a rechargeable battery according to claim 11, wherein the step of ending the constant temperature charging includes detecting at least one of a predetermined value for a function f (U,U',U") and a predetermined value for the ratio of losses of heat conduction and heat radiation to the inputted electrical energy and a predetermined change of the charging efficiency.

13. The method according to claim 7, wherein the semiconductor switch is integrated in one of a battery and a battery pack.

14. The method for charging a rechargeable battery according to claim 1, wherein the measuring step includes continuously measuring current flowing into and out of the battery and wherein the controlling step includes calculating the state of charge of the battery therefrom.

15. The method for charging a rechargeable battery according to claim 14, further comprising a step of displaying the state of charge of the battery.

16. The method for charging a rechargeable battery according to claim 14, further comprising the step of transferring data such as the state of charge of the battery to an electronic device.

17. The method for charging a rechargeable battery according to claim 5, wherein the step of controlling the pulsed charging current includes controlling its average value $i_{average}$ such that $i_{average}=kp\times(t1/(t1+t2))$, where kp is the amplitude of the pulse, t1 is the pulse width, and t2 is the period of the pulses.

18. Method for determining the end of the charging of a rechargeable battery, comprising the following steps:
   (a) detecting the portion of the inputted electrical energy that is chemically stored in the battery in the beginning of the charging process;
   (b) detecting a current value for the portion of the inputted that is chemically stored in the battery;
   (c) determining a (relative) charging efficiency by determining the ratio of the portions determined in steps (a) and (b);
   (d) comparing the charging efficiency determined in step (c) with a predetermined value; and
   (e) determining the end of the charging if the comparison in step (d) indicates that the charging efficiency is smaller than the predetermined value.

* * * * *